United States Patent [19]

Eisenmann et al.

[11] Patent Number: 4,836,644

[45] Date of Patent: Jun. 6, 1989

[54] FIBER OPTIC STAR COUPLER

[75] Inventors: Michael Eisenmann, Ulm; Edgar Weidel, Senden, both of Fed. Rep. of Germany

[73] Assignee: Licentia Patent-Verwaltungs-GmbH, Frankfurt am Main, Fed. Rep. of Germany

[21] Appl. No.: 185,383

[22] Filed: Apr. 25, 1988

[30] Foreign Application Priority Data

Apr. 24, 1987 [DE] Fed. Rep. of Germany ....... 3713658

[51] Int. Cl.⁴ .......................... G02B 6/26; G02B 6/28; G02B 6/36
[52] U.S. Cl. ..:........................... 350/96.16; 350/96.15; 350/96.20
[58] Field of Search ............... 350/96.15, 96.16, 96.20, 350/96.21

[56] References Cited

U.S. PATENT DOCUMENTS 4,011,005 3/1977 Hawkes et al. ................... 350/96.15

FOREIGN PATENT DOCUMENTS 2288237 1/1975 France .
2112166 7/1983 United Kingdom .

OTHER PUBLICATIONS

E. G. Rawson et al, "Bitaper Star Couplers With up To 100 Fibre Channels," Electronics Letters, vol. 15, No. 14 (Jul 5th, 1979, pp. 432–433.

Primary Examiner—William L. Sikes
Assistant Examiner—Akm E. Ullah
Attorney, Agent, or Firm—Spencer & Frank

[57] ABSTRACT

A fiber optic star coupler which is suitable, in particular, for monomode optical waveguides. This is realized by a multiple taper coupler configured as a hollow cylinder.

17 Claims, 2 Drawing Sheets

FIBER OPTIC STAR COUPLER

BACKGROUND OF THE INVENTION

The present invention relates to a fiber optic star coupler, and more particularly to a star coupler of the type having at least one input optical fiber, a plurality of output optical fibers, and a coupling region at which the input and output fibers are fused together.

Such star couplers are required, for example, for fiber optic distribution networks and for optical data bus systems. The operation of such a star coupler will be described with reference to FIG. 1, where input optical fibers 1 to 10 and output optical fibers 11 to 20 are connected at an optical coupling region 21. Assume, for example, that light is coupled into input optical fibers 1 to 10, with $P_1$ to $P_{10}$ being the associated input light energy. Coupling region 21 mixes light energies $P_1$ to $P_{10}$ in such a manner that, for example, the same percentage of light energy $P_1$ to $P_{10}$, if possible, exits from each of output optical fibers 11 to 20. That is, each one of the output optical fibers 11 to 20 individually carries the output light energy $P_1/10 + P_2/10 + \ldots - P_{10}/10$.

A publication by M. D. Bailey, entitled "Bitaper Star Couplers With Up To 1000 Fibre Channels," in Electronics letters, July 5, 1979, Volume 15, No. 14, pages 432 to 433, discloses the twisting together of a plurality (up to 100) of multimode, gradient profile optical fibers. Thereafter, the twisted location is heated in such a manner that the optical fibers are fused together. Additionally, a mechanical tensile stress is produced in the longitudinal direction of the optical fibers so that the cross sections of the individual optical fibers are reduced in the zone of the coupling region (the twisted and fused location). Such a coupling region is therefore configured as a full rod and, due to its internal light distribution, is therefore not suitable for use with monomode optical fibers.

Star couplers for monomode optical fibers are presently of interest from an economic point of view, for example for use with digital, high resolution television distribution networks. The reason for this economic interest is that monomode optical fibers have a significantly greater transmission bandwidth than multimode optical fibers and therefore permit a significantly greater data transmission rate, for example several Gbit/sec. Furthermore monomode optical fibers must be employed in optical transmission systems which operate with coherent light.

At present, star couplers for monomode optical fibers can be produced by fiber optic linkages of so-called 2×2 fiber optic taper couplers. Such a 2×2 taper coupler (FIG. 2) is composed of two input optical fibers, with the light energy from the input optical fibers being transmitted essentially uniformly to the output optical fibers. This is realized by fusing together the input and output optical fibers at coupling region 21'. Simultaneously, the cross-sectional areas of the individual optical fibers are reduced (tapered). At present, it is possible to assemble a monomode star coupler of several such 2×2 taper couplers.

FIG. 3 shows an example of the structure of such a monomode star coupler having four monomode input optical fibers to provide four input channels 101 to 104 and having four monomode output optical fibers to provide four output channels 110 to 140. Initially, optical input channel 101 is mixed with channel 102 and channel 103 is mixed with channel 104. This results in intermediate channels 101' to 104'. Then intermediate channel 101' is mixed with 103' and intermediate channel 102' is mixed with 104', resulting in output channels 110 to 140. A larger number of input and output channels requires a substantial number of 2×2 taper couplers, which is a considerable disadvantage. For $Z = 2^N$ channels, the number of 2×2 taper couplers required is given by $N \cdot 2^{N-1}$.

A few examples: for $8 = 2^3$ channels, twelve 2×2 taper couplers are required; for $32 = 2^5$ channels, eighty 2×2 taper couplers are required.

These 2×2 taper couplers must then be connected together in a defined manner and with the lowest optical losses, e.g. with the aid of splices produced by fusing together the optical fibers in an electric arc. Such a star coupler is therefore very cost-inefficient to manufacture, which is a drawback, and is additionally encumbered with high, annoying transmission losses.

SUMMARY OF THE INVENTION

It is therefore an object of the invention to provide a star coupler which can be manufactured cost-effectively and which, in particular, is suitable for monomode optical fibers.

This and other objects which will become apparent in the ensuing detailed description can be attained by providing a star coupler in which the coupling region is configured as a hollow cylinder.

A first advantage of the invention is that a star coupler can be produced which is smaller in size and mechanically more robust.

A second advantage is that only one coupling region exists. This avoids optical losses. Therefore, no additional splices are required.

DESCRIPTION OF THE PREFERRED EMBODIMENT

Figure 1:
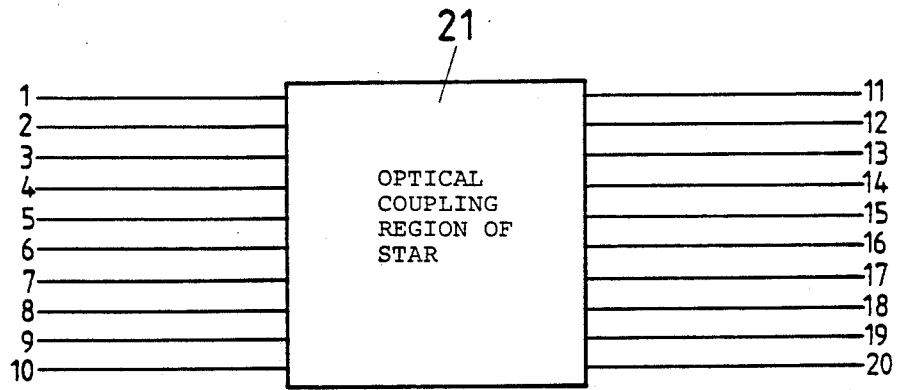
FIG. 1 schematically illustrates a star coupler having a plurality of input fibers and a plurality of output fibers which are optically connected at a coupling region.
Figure 2:
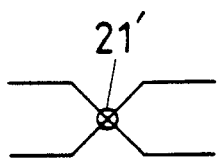
FIG. 2 schematically illustrates a monomode 2×2 taper coupler.
Figure 3:
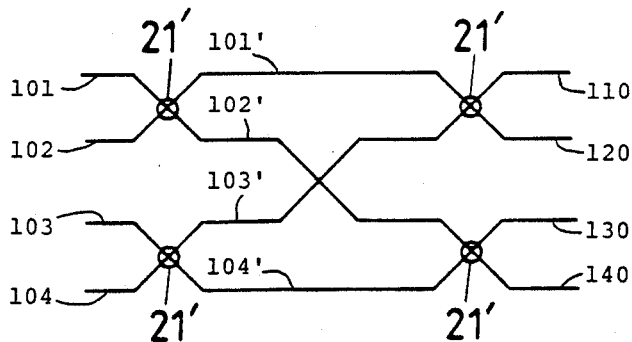
FIG. 3 schematically illustrates a plurality of 2×2 taper couplers connected to provide a monomode coupler for more than two input fibers and more than two output fibers.
Figure 4:
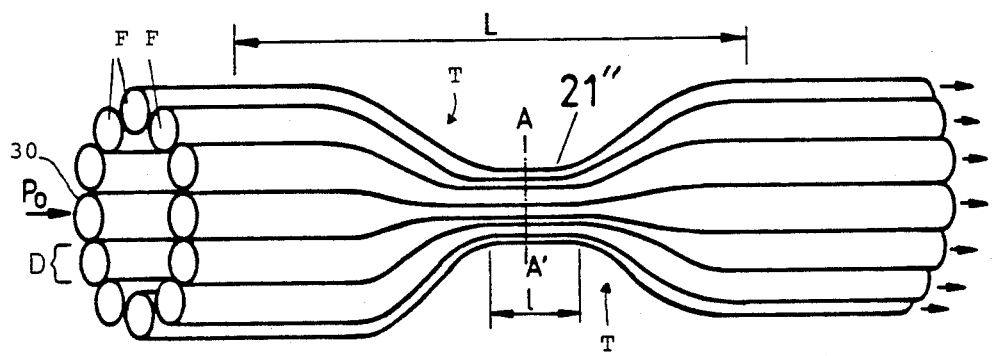
FIG. 4 is a perspective view schematically illustrating a star coupler, in accordance with the present invention, for twelve monomode optical fibers.

According to FIG. 4, the centers of monomode optical fibers F are arranged on a circular cylinder having a predetermined diameter. Each fiber F has a core (not illustrated) and cladding (not illustrated) around the core. The fibers F are preferably quartz glass monomode fibers having a so-called matched cladding. A fiber having a matched cladding usually is defined as a fiber which has a cladding with a constant refractive index. The material of the cladding, on the other hand, must not have the same chemical composition. The invention is applicable only to monomode fibers, the index of refraction of the core of the fiber may be a step-index distribution or a graded-index distribution.

In the region to the coupling L, the so-called primary coating of the optical fibers F (that is, the primary plastic coating, not illustrated) has been removed, for example over a length of more than about 20 mm, so that the surfaces (quartz glass) of the optical fibers F contact one another in the illustrated manner. The optical fibers F are then melted together and elongated by drawing, thus reducing their diameters D. So-called taper regions T result, as well as a coupling region 21" having a hollow cylindrical shape.

Figure 5:
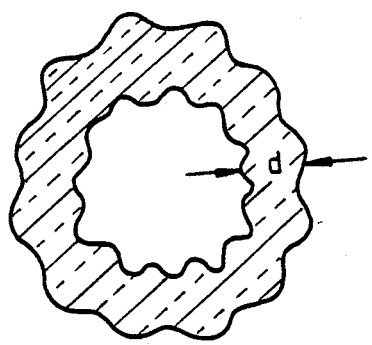
FIG. 5 is a cross-sectional view, taken along the line A-A' of FIG. 4, of the coupling region.

Coupling region 21" has a length 1 of approximately 20 mm, which is a function of the wavelength of the light. As is illustrated in FIG. 5, coupling region 21" has a relatively narrow, fused-together wall of approximately cylindrical configuration. The light is coupled over in the narrow wall of coupling region 21". In this narrow wall, the monomode (quartz glass) optical fibers F have been drawn, for example, from an original outer (cladding) diameter D of 125 μm to a (cladding) diameter d (see FIG. 5) of 10 μm to 20 μm. The light is then no longer guided through the cores of the optical fibers F but through their cladding regions, with the glass-air interface of the cladding being the decisive factor with respect to the ambient air. That is, the indices of refraction of the cladding and the surrounding medium (such as air) are such that total internal reflection occurs at the surface of the cladding, thereby retaining light within the approximately cylindrical wall of coupling region 21". Coupling region 21" provides an annular waveguide.

The star coupler shown in FIG. 4 is bi-directional, meaning that either end can be treated as the signal-input end. If one selects the left end as the signal-input end and feeds light at the energy $P_0$ into one of the input optical fibers F, for example into fiber 30, annular waveguide modes are excited in coupling region 21" (whose cross section is shown in FIG. 5) with the same optical phase. Since these modes have different delays, they go out of phase during their further passage through the annular waveguide. The resulting phase differences continuously increase during further passage of the light through the annular waveguide. If these phase differences differ from one another by a whole number multiple of $2\pi$, this will result in a constructive interference of the phases and thus in optical addition. At certain lengths given by the phase differences of the modes in the annular waveguide, the light energy (energy $P_o$) from the input optical fiber 30 is distributed to all twelve of the output optical fibers in the illustrated star coupler. This light has almost the identical (output) energy of about $P_o/12$.

To accomplish this, the length 1 must be set precisely during the manufacturing process. This is done by coupling light into a input optical fiber F during the drawing process. At the same time, the output light energy is measured at at least one output optical fiber. If the light energy is distributed essentially uniformly over all output optical fibers, the drawing process is terminated, e.g. by rapid removal and/or quenching of the required melting flame. The desired uniform distribution of the light to the output optical fibers is thus fixed and stable in time. The above-described star coupler can be coupled to a continuous input and/or output optical waveguide by methods presently customary in the art, for example by splicing with the aid of an electric arc.

Since constructive interference within the annular waveguide is determined by the differences in delay of the modes which are a function of the wavelength of the light, the length 1 to be set changes with the wavelength of the light employed. For optical transmission systems having slight differences in wavelengths this fact can be neglected.

The rotational symmetry of the arrangement also brings about the following: if uniform distribution to all output fibers has been realized for one input fiber, the same also applies for all remaining input fibers.

The present disclosure relates to the subject matter disclosed in Federal Republic of Germany application No. P 37 13 658.5 of Apr. 24th, 1987, the entire disclosure of which is incorporated herein by reference.

It will be understood that the above description of the present invention is susceptible to various modifications, changes and adaptations, and the same are intended to be comprehended within the meaning and range of equivalents of the appended claims.

what we claim is:

1. A fiber optic star coupler, comprising:
   at least one input optical fiber;
   a plurality of output optical fibers; and
   a hollow coupling region at which the fibers are fused together, the coupling region having a generally cylindrical configuration.

2. The star coupler of claim 1, wherein the fibers have a cross-sectional area in the coupling region that is reduced compared to their cross-sectional area away from the coupling region.

3. The star coupler of claim 2, wherein the coupling region has a length and a cross-sectional area that are selected so that predetermined portions of light energy that is received by the at least one input fiber are coupled into each of the output fibers.

4. The star coupler of claim 3, wherein equal portions of the light energy are coupled into the output fibers.

5. The star coupler of claim 1, wherein at least the output fibers are monomodal fibers.

6. The star coupler of claim 1, wherein the coupling region has a generally circular ring-shaped cross-sectional configuration.

7. An improved fiber optic star coupler which includes at least one first fiber and a plurality of second fibers which are fused together at a coupling region having first and second ends, the at least one first fiber extending from the first end of the coupling region and the plurality of second fibers extending from the second end, wherein the improvement comprises:
   the coupling region is configured as a hollow tube.

8. The star coupler of claim 7, wherein at least a portion of the hollow tube is generally cylindrical and provides an annular waveguide for light traveling through the coupling region.

9. The star coupler of claim 8, wherein the annular waveguide has a length selected so that equal amounts of light received by the at least one first fiber are distributed to the second fibers.

10. The star coupler of claim 9, wherein the annular waveguide has a length of about 20 mm.

11. The star coupler of claim 7, wherein the first and second fibers have a predetermined diameter, and wherein at least a portion of the tube has a generally cylindrical wall, the wall having a thickness that is less than the diameter of the fibers.

12. The star coupler of claim 7, wherein the hollow tube has a generally cylindrical portion disposed between two tapered portions, the tapered portions being generally frusto-conical in configuration.

13. A method for making a fiber optic star coupler, comprising the steps of:
   (a) arranging a plurality of optical fibers parallel to one another in a generally tube-shaped pattern, the fibers having first and second ends;
   (b) heating the fibers between the first and second ends to fuse the fibers together;
   (c) introducing light having a predetermined power level into the first end of one of the fibers;
   (d) measuring the power level of light exiting the second end of one of the fibers; and
   (e) stretching the heated region until the power level measured in step (d) reaches a predetermined value.

14. The method of claim 13, wherein there are N fibers, and wherein step (e) is conducted until the power measured in step (d) is approximately 1/Nth of the predetermined power introduced in step (c).

15. The method of claim 13, wherein step (a) is conducted by arranging the fibers in a cylindrical pattern.

16. The method of claim 13, wherein the fibers are monomodal fibers and step (c) is conducted by introducing coherent light.

17. A fiber optic star coupler made by the method of claim 13.

* * * * *